May 16, 1933.   J. V. MARTIN   1,909,878
RESILIENT TIRE
Filed Sept. 16, 1929   3 Sheets-Sheet 3
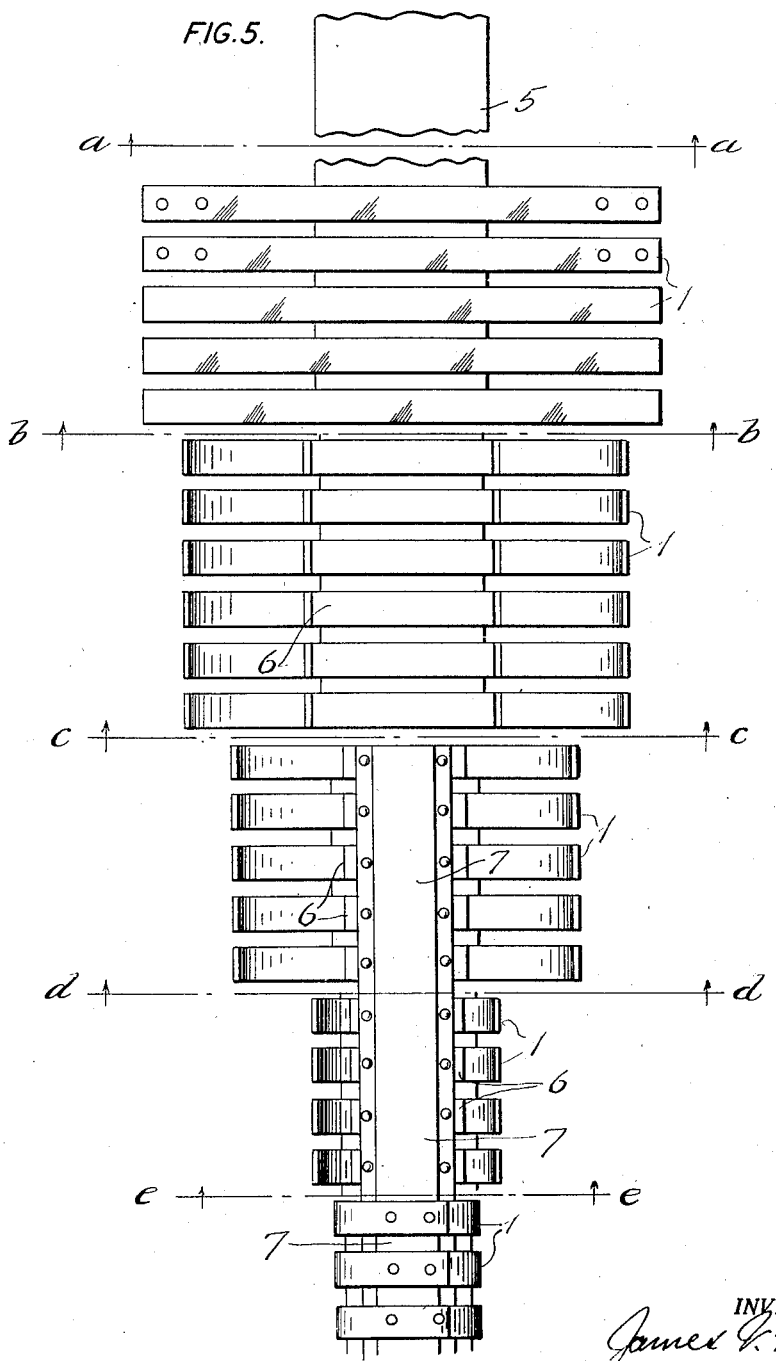

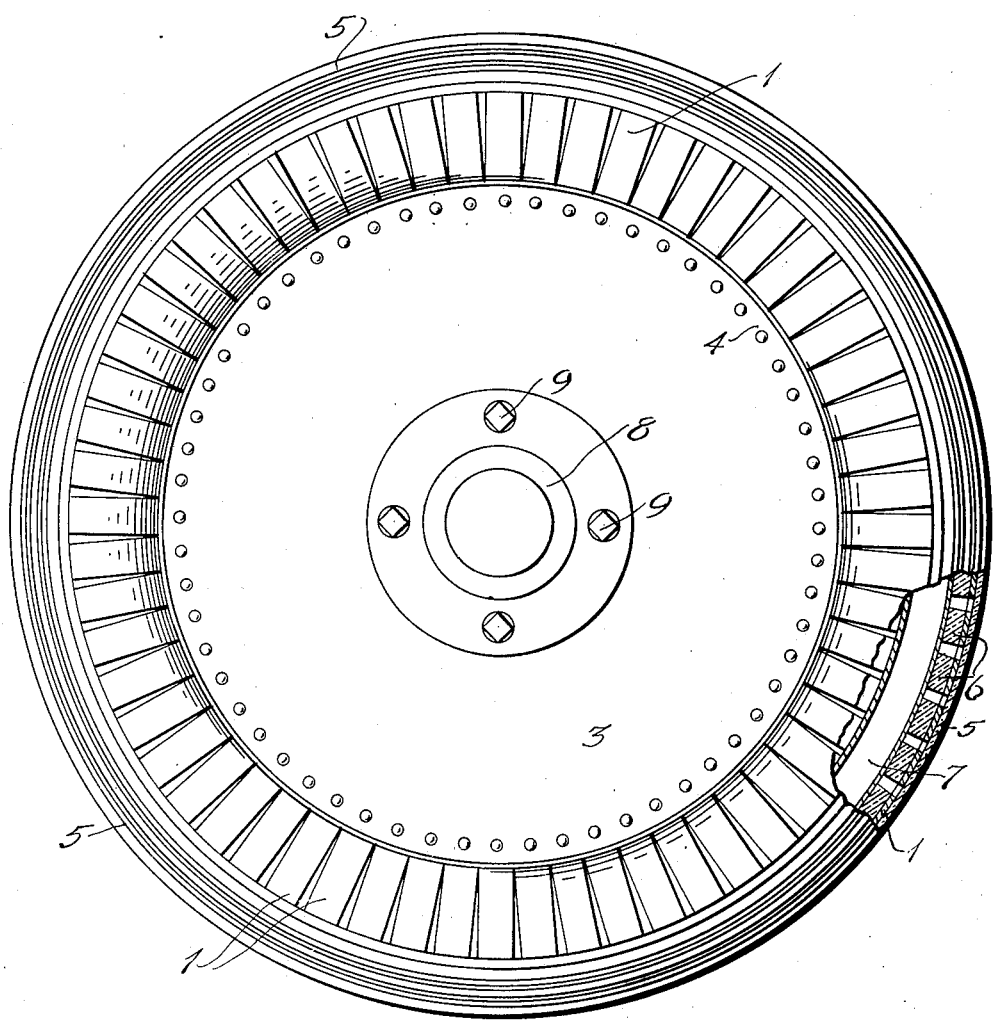

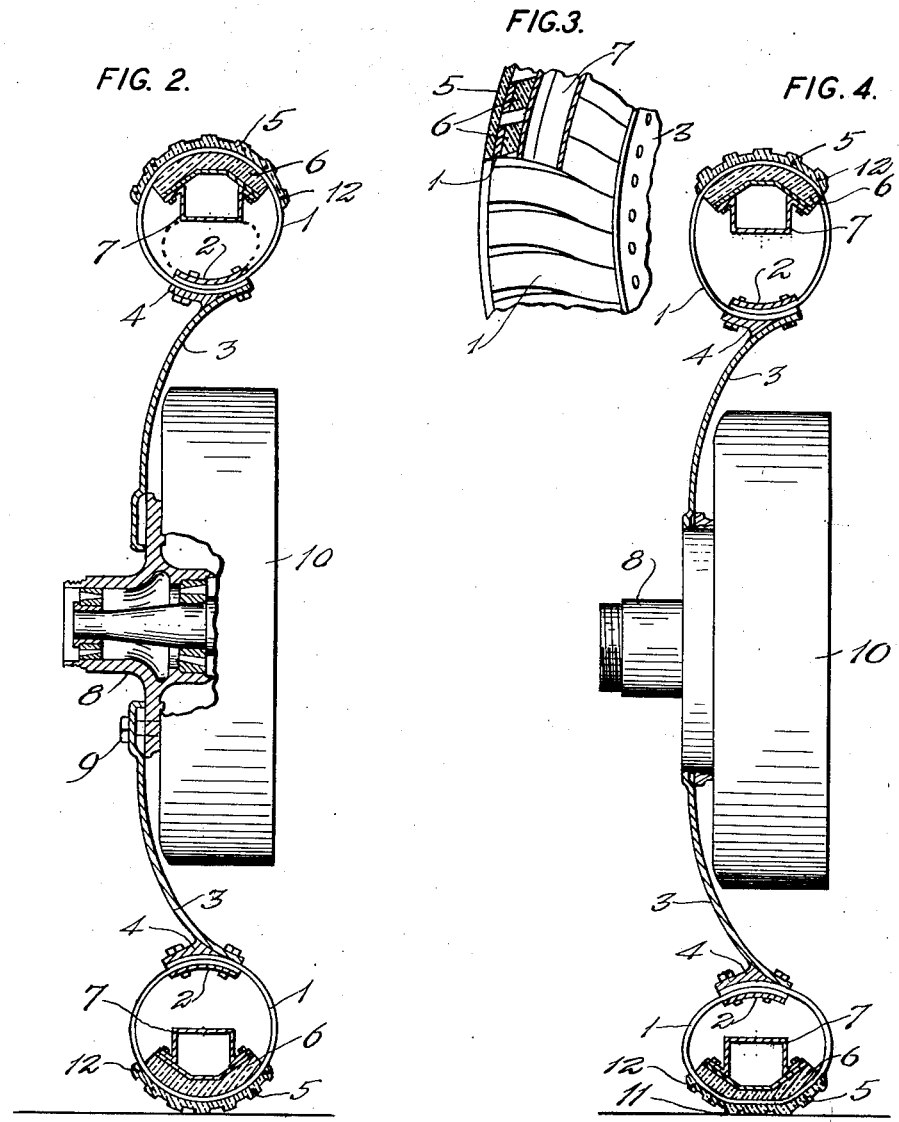

Patented May 16, 1933

1,909,878

UNITED STATES PATENT OFFICE

JAMES V. MARTIN, OF GARDEN CITY, NEW YORK

RESILIENT TIRE

Application filed September 16, 1929. Serial No. 392,938.

This invention relates to resilient tires for vehicles and more particularly to non-puncturable type tires, possessing in as great or greater degree the cushioning, coolness, lightness and durability of the present day pneumatic balloon tire while eliminating the hazards and delays due to blowouts and reducing the cost of such tires.

The outstanding problems to be overcome are heat, weight, complication of structure and lack of lateral strength, and it is the primary object of the invention to so join and dispose rubber and steel springs as to obviate the aforementioned difficulties.

Another object of the invention is to provide a simple form of wheel adapted for ready attachment to the new form of tire and affording ample room adjacent the inside wheel hub for the shock-absorber brackets and brakes more fully disclosed in my Patent No. 1,821,657 and improving the wheel-tire cooling features shown in my Patent No. 1,862,693.

Other objects of the invention will be disclosed as the description proceeds. Referring to the drawings:—

Fig. 1 shows my invention as viewed from the outside of a vehicle a portion of the tread and springs being broken away to reveal a portion of the center in section.

Fig. 2 is a cross section of the invention through its center.

Fig. 3 is a view partly in section showing parts of the new tire in deflected positions due to loading.

Fig. 4 is a similar view to that of Fig. 2, but designed to illustrate the form and action of the tire under load.

Fig. 5 is a view showing the progressive steps in the manufacture of the invention.

My new form of tire is made up of a multiple of steel springs 1, bent round and attached to a band 2, Fig. 2 and the steel spring loops, thus assembled, are attached in any suitable manner to a wheel disc 3 at the wheel rim, 4. A tire tread 5 is vulcanized to the outer loops of the steel springs 1, and cushion rubber pads 6 are vulcanized upon the inside of each spring opposite to the place where, on the outside, the tread is attached. Each rubber pad 6 is vulcanized or otherwise attached to a semirigid circular channel hoop 7. This is made up of aluminum or light gauge steel with the material disposed to resist deformation in every direction and affording sufficient strength in conjunction with the rubber parts 6 and the steel springs 1 to retain the proximate semicircular form of its upper half. The dotted lines at top of Fig. 2 indicate an auxiliary air tube. The wheel disc 3 can be attached to the wheel hub or spindle parts 8 in the usual demountable fashion as at 9, and 10 designates a brake drum suitable for either rear or front wheel of an automobile.

In Fig. 1 it will be noticed that the spring loops separate near the tread permitting free access of the air through the tire walls and to the internally disposed parts such as the rubber blocks 6 and the metal hoop 7, thus all the rubber in the tire is disposed for rapid cooling from both the air directly and from metal parts having much comparative area for use as a radiator of heat.

The function of the hoop 7 is to bring about a cooperation of all the tire springs and rubber blocks or pads 6 in resiliently resisting loads imposed by loading the hub and disc and passing this load through the tire to the road. It is proposed to construct the tire of steel spring loops so light that they would be crushed beyond their elastic limit if only those loops adjacent the road contact were involved in resisting the load. But, with the hoop 7 attached by soft rubber pads to each spring, every spring in the entire tire is called upon to add its yielding resistance to the portion of the tire under load. For example:—

When the tire contacting the road under a heavy load, as at 11 of Fig. 2, is forced to change its shape the first effect of the loading is communicated to the steel loops by the tread which is reinforced by wires 12, this causes the springs adjacent the load to yield and as they do so the rubber pad on each loaded spring will be compressed and communicate its load to the hoop 7, but in order to move the hoop 7 eccentrically of its center and the hub 8 center it will be necessary to move every rubber pad and through them every steel loop. While the loops between the hub and the road will be forced to take a somewhat oval shape transverse to the load the hoop will force the loops at the top of the tire, Fig. 2, to take an elongated shape in the plane of the load and along the sides of the tire intermediate the top and loaded portion the hoop will put the rubber pads in tension and pull the springs as shown in Fig. 3. By altering the size and yielding quality of the rubber pads it is contemplated that the spring action can be so limited that under the worst blows the elastic limit will not be passed.

What I claim as new is:—

1. A steel spring tire including multiple flat springs formed into a casing and each said spring joined to a wheel rim in two places and having a tread vulcanized to the outside of the said springs opposite the said juncture, and a comparatively rigid member joining the said springs inside of the said tread, the said rigid member having angular portions extending in the rotational plane of the said tire.

2. A tire composed of multiple steel loops attached to a wheel rim and connected together opposite the said attachment by rubber parts and a full floating semi-rigid hoop member angularly formed of sheet metal and located within the said loops.

3. A tire casing including a rubber tread cured to multiple steel springs, rubber connecting each spring opposite the said tread to a tubular hoop otherwise freely disposed within the said casing and the said springs spaced apart where they form the walls of the said casing to provide air openings therebetween.

4. A steel spring tire including steel springs formed into loops and joined to a rim, yieldable means of attaching all the loops to a full floating hoop located within the said loops.

5. A wheel and tire combination including a disc mounted on a wheel hub and formed at its perifery into a rim, a full floating hoop formed to resist distortion and rubber pads connecting with the said hoop and the said wheel to hold the latter in tension, suspended from the top portion of the said hoop.

6. A wheel and tire combination including a central wheel portion carrying a rim, a full floating hoop of greater transverse than radial cross section, yieldably attached to said rim by means including rubber pads extending across the tire from side to side thereof, the said pads in the said side to side dimension being several times greater in dimension than their dimension along the radial arc of the tire.

7. A combination according to claim 6 and the said pads separated from each other to provide free air spaces across the tire from side to side thereof.

8. A tire composed of multiple steel loops, a rubber tread attached to each of the said loops and an angularly formed sheet metal hoop connecting the said loops to make them work in unison.

9. A tire composed of multiple steel loops forming a tire casing with open side walls between the said loops and means located within the said loops and including a semi-rigid hoop angularly formed of sheet metal and connecting all of the said loops to make them work in unison.

10. A vehicle tire including a hoop angularly formed of sheet metal for lightness and strength and having multiple rubber connections to a wheel rim, the said rubber connections being of greater transverse than circumferential dimension and yieldably resisting the downward movement under load of the said rim away from the upper semicircle of the said hoop.

11. A combination according to claim 10 and the said sheet metal hoop of greater transverse than vertical cross section.

In testimony whereof I affix my signature.

JAMES V. MARTIN.